(No Model.)

H. C. SPALDING.
APPARATUS FOR LAYING UNDERGROUND CONDUCTORS.

No. 327,474. Patented Sept. 29, 1885.

WITNESSES
Alex. L. Hayes
C. B. Welch

INVENTOR
Henry C. Spalding

UNITED STATES PATENT OFFICE.

HENRY C. SPALDING, OF BOSTON, MASSACHUSETTS.

APPARATUS FOR LAYING UNDERGROUND CONDUCTORS.

SPECIFICATION forming part of Letters Patent No. 327,474, dated September 29, 1885.

Application filed December 29, 1883. Renewed February 28, 1885. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Apparatus for Laying Underground Conductors, of which the following is a specification, reference being had to the drawings accompanying and forming a part of the same.

In a previous application filed by me in April, 1882, I have shown and described an apparatus for laying conductors in trenches or the like, consisting, mainly, of a frame supporting a given number of reels or spools and mounted upon wheels. Upon said reels the conductors are wound, and from them they are delivered as the carriage is moved along over the trench. The subject of my present application is a device of this character, with which are combined certain instrumentalities which render the device as an entirety much more serviceable and useful, and an improvement on the form described.

My improvements involve, mainly, the combination, with the reel-holding carriage, of a guide-bar adjustable vertically and horizontally, and which is arranged to maintain the wires when under tension in line with the axis of the receptacle in which they are laid.

The invention further consists in the combination, with the spool or reel holding carriage, of a guide or guides for preventing contact between the wires from different reels, and also in the combination, with a device constructed in the manner described, of a pivoted supporting-bar. These, with other features entering into the construction of the apparatus, will be more fully described by reference to the accompanying drawings.

Figure 1:
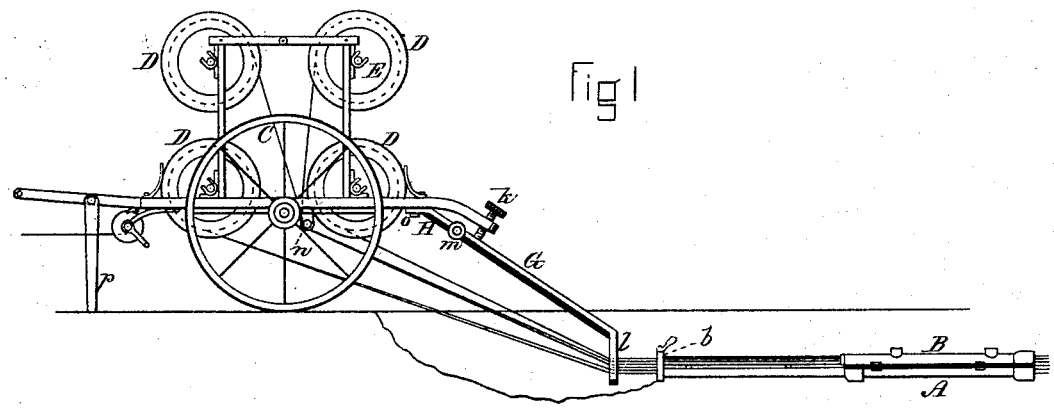
Figure 2:
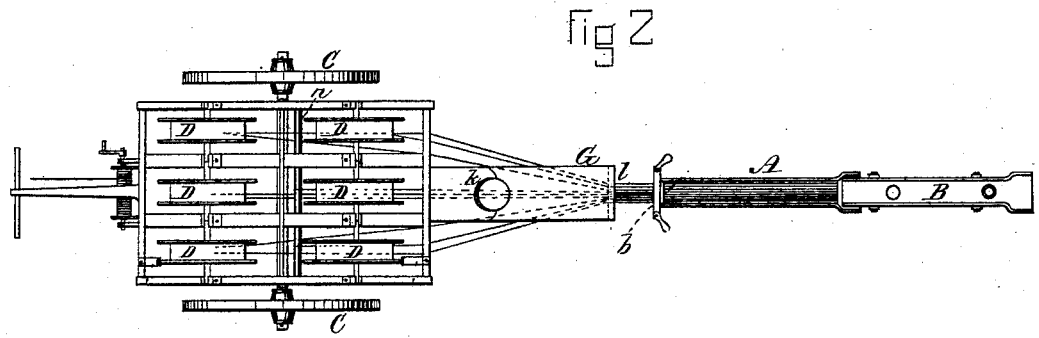

Figure 1 is a view of the apparatus in elevation, and illustrating the manner in which the same is or may be used. Fig. 2 is a plan view of the same.

Similar letters indicate corresponding parts in the figures.

The apparatus consists in a frame supporting the desired number of reels or spools, D, and mounted on wheels C. To the forward portion of the frame is pivoted a bar, $p$, which is used for holding the carriage in position when stationary. The bed or base of the reel-holding frame, or a portion thereof, is extended somewhat in the rear, and under it is pivoted an arm, H, by a bolt, $o$, in such manner that the said arm may have a movement in a horizontal direction. To the arm H, which extends downward from the frame at an angle, is hinged or pivoted at $m$ a bar, G, provided with a vertical extension, $l$, containing a given number of perforations, or otherwise constructed as a guide for the wires which are to be laid. An adjusting-screw, $k$, passes through the extension of the frame and serves to adjust the bar G vertically. In the lower part of the frame is a guide, which may be a simple bar or roller, $n$. Under this the wires from the upper reels are carried, so that in running out they do not touch the lower reels in the rear of the frame nor the wires from the same.

This apparatus is used in the following manner: The wires from the upper reels being carried under the guide $n$ and through perforations in guide $l$, and the wires from the lower reels being carried directly through guide $l$, the carriage is drawn along, the bar G being depressed more or less, according to the depth of the trench, so that the wires will be brought down in line with the conduit or receptacle in which they are laid.

The means for holding and protecting the wires may be greatly varied. I prefer, however, to use sectional pipes A B, such as I have described in other applications, and to stretch the wires in the under sections on or in suitable rests. The under sections, A, are laid first, the wires strung in them, a guide-plate, $b$, being convenient for this purpose. The upper sections are then applied and the whole filled with an insulating compound, if so desired.

I have confined the above description principally to those features shown which enter into the present invention.

Certain other parts are not specifically described, for the reason that they form the subject of another application.

Having now described my invention and the way in which the same is or may be used, what I claim is—

1. In an apparatus for laying underground conductors, the combination, with the reel or spool holding frame or carriage, of a guide-bar for delivering the wires connected adjustably to the frame, in substantially the manner set forth.

2. In an apparatus for laying underground conductors, the combination, with the reel or spool holding frame or carriage, of a pivoted guide-bar for delivering the wires, and a screw for adjusting the vertical position of said bar with reference to the frame, as set forth.

3. In an apparatus for laying underground conductors, the combination, with a traveling frame or carriage, of reels or spools carried thereby, a guide for the wires of the upper spools, and an adjustable guide-bar for delivering the wires, substantially as herein described.

4. The combination, with the wheeled reel or spool frame or holder, of the adjustable bar G, extending downward from the frame, and provided with a guide, $l$, at its extremity, as set forth.

5. The combination, with the wheeled reel or spool frame or holder, of the pivoted supporting-bar $p$ and the adjustable guide-bar G, extending downward from the frame, as set forth.

In witness whereof I have hereunto signed my name in the presence of the two subscribing witnesses.

HENRY C. SPALDING.

Witnesses:
 ALEX. L. HAYES,
 GEO. L. WARD.